United States Patent
Van Der Wolf et al.

(10) Patent No.: US 6,415,377 B1
(45) Date of Patent: Jul. 2, 2002

(54) DATA PROCESSOR

(75) Inventors: Pieter Van Der Wolf; Kornelis A. Vissers, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/325,674

(22) Filed: Jun. 3, 1999

(30) Foreign Application Priority Data

Jun. 8, 1998 (EP) .............................................. 98201888

(51) Int. Cl.[7] .......................... G06F 9/34; G06F 13/40; G06F 13/14; G06F 12/02
(52) U.S. Cl. ...................... 712/207; 712/227; 712/202; 711/216; 711/125; 711/126; 711/132; 711/133; 711/169; 710/54; 710/52; 710/53
(58) Field of Search .................................. 711/219, 211, 711/123, 169, 149, 213, 251, 214, 218, 216, 217, 220, 702, 207, 619, 152, 108, 111; 712/239, 230, 237, 245, 258, 246, 240, 247, 233, 231, 207, 211; 710/52, 58, 36, 33, 54

(56) References Cited

U.S. PATENT DOCUMENTS

| | | | |
|---|---|---|---|
| 5,371,870 A | 12/1994 | Goodwin et al. | ............ 395/425 |
| 5,461,718 A | 10/1995 | Tatosian et al. | ............ 395/416 |
| 5,649,144 A | 7/1997 | Gostin et al. | ............ 395/421.1 |
| 5,655,114 A * | 8/1997 | Taniai et al. | ................. 712/237 |
| 5,659,713 A | 8/1997 | Goodwin et al. | ............ 395/484 |
| 5,909,704 A * | 6/1999 | Ireland | ........................ 711/219 |

* cited by examiner

*Primary Examiner*—Daniel H. Pan

(57) ABSTRACT

The data processor contains a memory and a data prefetch unit. The data prefetch unit contains a respective FIFO queue for storing prefetched data from each of a number of address streams respectively. The data prefetch unit uses programmable information to generate addresses from a plurality of address streams and prefetches data from addresses successively addressed by a present address for the data stream in response to progress of execution of a program by the processor. The processor has an instruction which causes the data prefetch unit to extract an oldest data from the FIFO queue for an address stream and which causes the data processor to use the oldest data in the manner of operand data of the instruction.

6 Claims, 2 Drawing Sheets

```
ADD    IF  ID  EX  WB
LD         IF  ID  EX  EX  EX  WB
```

```
QLOAD  IF  ID  WB
ADD        IF  ID  EX  WB
```

```
QLOAD  IF  ID  WB
ADD            IF  ID  EX  WB
```

```
       IF  ID  •   WB
           IF  ID  EX  WB
```

DATA PROCESSOR

BACKGROUND OF THE INVENTION

The invention relates to a data processor according to the precharacterizing part of claim 1.

Such a data processor is known from U.S. Pat. No. 5,649,144. A data processor uses memory and registers for storing data. Access to data from registers is usually performed within one processor cycle, but access to memory is slower, because memory circuits are slower than register circuits and because access to memory requires a cycle for accessing an address. To speed up access to memory, use can be made of cache memory. A cache memory is a small and fast memory, used to store copies of data from a larger and slower main memory. Data which is needed is fetched from main memory into the cache.

U.S. Pat. No. 5,649,144 describes a mechanism for prefetching of data into a cache memory called stream prefetching. The idea underlying stream prefetching is that many of the addresses of data that a processor needs from memory come from a small number of streams of addresses. In each of the address streams the addresses change in a predictable way, for example each time by addition of a fixed number. In stream prefetching a data prefetch unit uses the addresses from such streams to "pre"-fetch data, that is, fetch data ahead of reception of an instruction that addresses the data for use in the processor. Each time the processor needs data from a new address in a stream, the data prefetch unit computes a next prefetch address from that stream, so that data may be prefetched from the next address in main memory into a cache memory.

Subsequently, when the processor actually needs the data from the next address, the processor executes a load instruction with the next address. When the data has been prefetched into the cache memory, it will be possible to complete this load instruction from the cache memory in a small number of processor cycles; if the data had not been prefetched and also was not otherwise available in the cache memory a larger number of processing cycles would have been necessary to fetch the data from slower main memory.

Although the use of a cache and stream prefetching reduces the delay between the load instruction and the availability of data to a few processor cycles, this delay is still larger than the time needed to access data from registers, which can be done within one clock cycle.

Amongst others, it is an object of the invention to reduce the delay needed to access data from address streams.

SUMMARY OF THE INVENTION

The data processor according to the invention is characterized by the characterizing part of claim 1. Thus, the instruction accesses data from selectable FIFO queues, much as if each queue were a further register. The data processor generally has a register file for storing normal operands. The instruction set of the data processor contains at least one further instruction that causes the data processor to effect transport of data from the register file, where the data processor effects transport of data in the same way in response to both the instruction mentioned in claim 1 and the further instruction, except that the instruction mentioned in claim 1 causes the data processor to take data from the FIFO queue instead of from the register file.

The accessed data from the FIFO queue is data that has generally been prefetched in response to an earlier instruction and is therefore usually directly available. Preferably, the latency for accessing the FIFO queue (that is the time needed to access the data) is the same as for normal registers, i.e. one processor clock cycle.

An embodiment of the data processor according to the invention is described in claim 3. In this embodiment the FIFO queue has a full/not full indicator. The present address is updated and data is prefetched from the memory location addressed by the present address when the FIFO is indicated as not full. Extraction of the oldest data will turn a full FIFO into a "not full" FIFO and therefore indirectly causes data to be prefetched. After the initial definition of the stream a certain amount of data will be prefetched until the FIFO is full even before extraction of any data from the FIFO queue.

Preferably, the prefetch of data from the address streams into the FIFO queues is performed through the cache memory. That is, the data prefetch unit issues the present address to the cache memory, if necessary the cache memory loads the data corresponding to the present address from main memory and stores the data in the cache memory. The cache memory supplies the data to the FIFO queue. Thus, in addition to the FIFO, the cache memory also has the data available for relatively fast access before and after the data is extracted from the FIFO queue. In addition to the prefetched data for the queue, the cache may fetch an entire block of say 64 bytes containing the prefetched data for the queue, so that data from that block will also be available for fats access.

The FIFO full/not full signal may be used to control how much data is prefetched into the cache memory. Moreover, without further overhead the data processor is able to use the cache mechanisms for replacement of data, for fetching data from main memory or for providing a copy of the data from the cache memory if this data is already available in the cache memory. No new main memory access conflicts will be introduced by the addition of the FIFO queues.

Preferably, the data processor also has an instruction for starting prefetching according to an address stream. Preferably this instruction tells the processor how to predict the addresses from the address stream and it tells the processor the logical queue number of that address stream and thereby directly or indirectly the FIFO to be used. The addresses may be predicted for example by means of an initial value for a present address of the address stream and a stride value by which the present address may be incremented repeatedly to determine successive addresses from the address stream.

BRIEF DESCRIPTION OF THE DRAWINGS

These and other advantageous aspects of the data processor according to the invention will be described in the following detailed description by reference to figures, in which.

DESCRIPTION OF THE PREFERRED EMBODIMENTS

Figures 1, 2A, 2B, 2C, 2D:
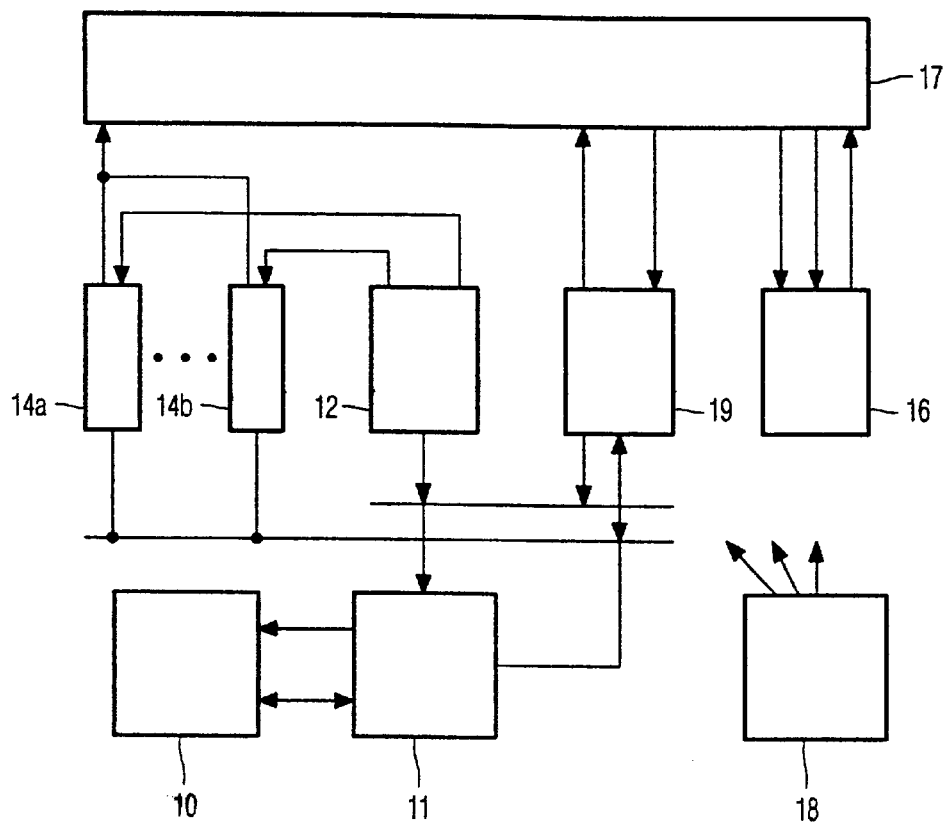
FIG. 1 shows a data processor according to the invention.
FIGS. 2a–d show cycles of pipelined execution of instructions.

FIG. 1 shows a data processor according to the invention. This data processor contains a main memory 10, a data cache memory 11, a data prefetch unit 12, FIFO queues 14a,b, an execution unit 16, a register file 17, an instruction issue unit 18 and a load/store unit 19. The cache memory 11 is connected to main memory 10 via a memory address bus and a memory data bus. The cache memory 11, the data prefetch unit 12 and the load/store unit 19 are interconnected via an address bus. The cache memory has a data bus coupled to the FIFO queues 14a,b and the load/store unit 19. The FIFO queues 14a,b are connected to a write port of the register file 17, the load/store unit is coupled to a read port and a write port of the register file 17 and the execution unit 16 is connected to two read ports and a write port of the register file 17. The instruction issue unit 18 is connected to the execution unit 16, the load/store unit 19 and the data prefetch unit 12.

Although FIG. 1 shows only one execution unit 16 and one load/store unit 19 by way of example, the data processor may actually contain more than one of such units or other units in parallel, for example in a VLIW (Very Long Instruction Word) architecture. In a VLIW architecture, the instruction issue unit 18 can issue instructions to the execution unit(s), load/store unit(s) and data prefetch unit(s) in parallel.

The FIFO queues are circuits capable of loading data words at an input side and outputting data words at an output side in the order in which these data words were loaded. Various embodiments of FIFO queues are known per se from the art. Although FIG. 1 shows two FIFO queues 14a,b by way of example there may be more than two FIFO queues in parallel to the FIFO queues 14a,b.

In operation, the instruction issue unit issues instructions to the execution unit 16, the load/store unit 19 and the data prefetch unit 12. In response to these instructions, the execution unit 16 loads operand data from register file 17 operates on this operand data and writes back result data to the register file 17. In response to load/store instructions, the load/store unit 19 writes data from memory 10, 11 into the register file 17 or writes data from the register file 17 to memory 10, 11. For this purpose, load/store unit 19 supplies memory addresses to data cache memory 11 via the address bus. In case of a load operation, if the content of the memory address is present in data cache memory 11, the data cache memory 11 returns this data to load/store unit 19, which writes the data into the register file 17. If the data is not present in data cache memory 11, data cache memory 11 supplies the address to main memory 10, via the memory address bus. In general, the cache memory will load not only the requested data (e.g. one word of 4 bytes), but a block of data (e.g. 64 bytes) containing the requested data.

Main memory 10 returns the block to the data cache memory 11 and the cache memory 11 returns the requested data from the block to the load/store unit 19 and stores a copy of the block of data. If necessary, cache memory 11 makes room for storing the copy by discarding other data, and writing back the other data to main memory 10 if it has been written into cache memory 11 by load/store unit 19. In case of a store operation, load/store unit 19 writes the data into the cache memory 11, which makes room for this data if necessary; alternatively the data is written directly to main memory and stored into the cache only if necessary for reasons of consistency (write through).

The data prefetch unit 12 uses the concept of multiple data streams to ensure that data is present in the data cache memory 11 before this data is loaded by the load/store unit 19. Each data stream is represented for example by a (present address, stride) tuple; two or more of these tuples are stored in the data prefetch unit 12, each for a particular address stream. The initial value of the present address and the stride are programmable. The stride may assume the value 1, −1, or larger positive or negative values.

At certain timepoints, the data prefetch unit 12 changes the present address for a particular stream by adding the stride for that particular stream. Thus, the present address of the particular stream runs through a stream of addresses. The data prefetch unit 12 issues the values of the present address to the data cache memory 11 via the address bus. If the data in the memory location addressed by the present address is not present in data cache memory 11, data cache memory 11 will then fetch this data from main memory 10. Thus, if load/store unit 19 subsequently issues the present address, the corresponding data will be available from data cache memory 11 and no time need be lost for fetching this data from main memory 10. If the stride value is not larger than the cache block size, only some of the present addresses will make it necessary to fetch from main memory.

The selection of the stride is adapted to the data needs of the program and is under software control. Because the stride may take other values than plus or minus one, a non-continuous range of memory locations may be prefetched. For example, 4 byte (32 bit) data words may be prefetched, but the stride may for example be 1024, so that only every 256th 32 bit word is prefetched (in case of 8 bit memory locations). In contrast to prefetching from a continuous range of memory locations this means that it can be avoided that data is prefetched unnecessarily from memory locations between memory locations that are actually needed, which would reduce the efficiency of execution of programs by the processor. Of course other prefetch word sizes than 32 bit may be used.

A start preload queue instruction issued from instruction issue unit 18 causes data prefetch unit 12 to load an initial value of the present address and a stride value and to enable preloading according to this present address and stride value.

The start preload queue instruction is part of a program executed by the data processor and specifies a stream number, the initial address and the stride value. Optionally the start preload queue instruction may also specify the maximum number of data-items that may be preloaded into the FIFO. In response to the start preload queue instruction the data prefetch unit 12 loads present address and the stride value into storage locations for the specified stream number. If necessary, a FIFO queue 14a,b for the specified stream number is cleared.

Subsequently the data prefetch unit 12 prefetches data from the present address. To do so data prefetch unit 12 requests access to the address bus with a lower priority than the load/store unit 19. In addition the data prefetch unit 12 may increment the present address value a predetermined number of times in response to the start preload queue instruction, each time prefetching data from the present address.

Each of the FIFO queues 14a,b corresponds to a respective one of the address streams. Each time when the data cache memory 11 returns data prefetched for a particular stream, the data prefetch unit 12 signals the particular FIFO queue 14a,b corresponding to that particular address stream to load the returned data.

A "qload" instruction from the instruction issue unit 18 specifies an address stream number S and a target register R.
 qload S,R
Load instructions of this type are contained in the program executed by the data processor. The qload instruction causes data prefetch unit 12 to enable the FIFO queue corresponding to the specified address stream S to extract the oldest data in the FIFO queue 14a,b and load this data into the target register R in register file 17. "Extraction" means that the data is output from the FIFO queue 14a,b and effectively removed from the FIFO queue 14a,b, so that at the next extraction the next more recently loaded data will be output.

When the data is extracted the data prefetch unit 12 signals the register file 17 to load the data from the FIFO queue 14a,b into the target register. This can be done with a latency of one processor clock cycle, which is the same latency as for retrieving data from the register file 17. This latency is smaller than the latency for reading from data cache memory, because the qload instruction directly specifies the associated FIFO queue 14a,b (there being only a small number of FIFO queues) and because the FIFO queues 14a,b are relatively small and fast circuits. If no data is yet available in the associated FIFO queue, the data prefetch unit 12 may cause the data processor to stall: issuing of new instructions is suspended until the data becomes available (or at least, in a superscalar architecture, issuing is suspended of instructions that need a result of the queue load).

FIGS. 2a–d show cycles of pipelined execution of instructions. FIG. 2a shows execution of two conventional instructions: an ADD instruction executed by the execution unit 16 and a normal LOAD instruction executed by the load/store unit 19. Stages of execution executed in successive cycles are IF (instruction fetch), ID (instruction decode, including fetching operands from registers addressed in the instruction), EX (execution of the instruction) and WB (writeback of the result). If a bypass network (known per se) is used, the result of an instruction may be fetched as an operand before it is written back, i.e. the EX stage which produces a result may be followed by the EX stage of an instruction using the result without intervening WB stage. Typically the EX stage of an ADD instruction takes one cycle and the EX stage of a LOAD instruction takes three cycles. Thus, it is said that the ADD instruction has a latency of one cycle and the load instruction has a latency of three cycles.

FIGS. 2b–d show the stages of pipelined execution of the qload instruction. In principle, data is available from a FIFO as fast as from a register. Therefore, an execution stage is not needed for a qload instruction. This is shown in FIG. 2b. Another instruction which uses the result of the qload instruction may be scheduled simultaneously with the qload instruction if a bypass network is available. Therefore this qload instruction is said to have a latency of zero cycles.

FIG. 2c shows a case were no bypass network is available or used. Now the instruction using the result of the qload instruction has to be scheduled at least one cycle after the qload instruction, which is now treated as having a latency of one cycle. This is convenient for standard compilers which assume that the latency is at least one cycle.

FIG. 2d shows a case where a delay register is inserted between the FIFO's and the register file. The delay register delays the availability of the data by one cycle. This means that effectively there is a stage like a one cycle execution stage (symbolized by a dot) and the data is available with a latency of one cycle. This is convenient for standard compilers which assume that the latency is at least one cycle.

In each of FIGS. 2b–d the data is available from the FIFO just as any other operand data passed between the register file and the execution unit with the same or less latency than such other operand data. This latency is much shorter than the latency for loading from the cache memory. In a further alternative, the processor may provide for handling each FIFO as a register from the register file, so that the data from the FIFO can be fetched as part of the ID stage of any instruction such as the ADD instruction.

Figure 3:
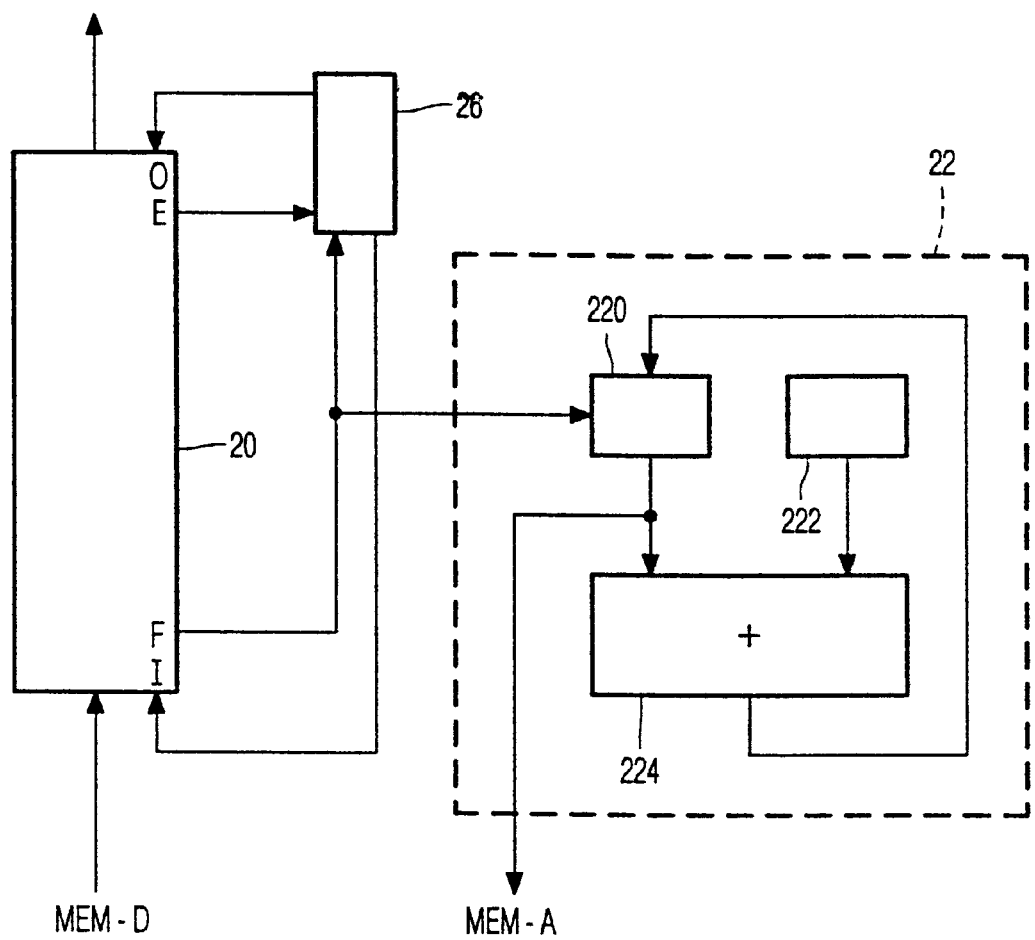
FIG. 3 shows a FIFO register and a stream address computation unit.

FIG. 3 shows a combination of a FIFO register 20, a control unit 26 and address stream computation unit 22. The FIFO register has a data input and a data output, a load enable input I, an extract enable input O and an empty signal output E and a full signal output F coupled to the control unit 26. The FIFO register has room for storing data items from for example up to 8 addresses from the stream. The address stream computation unit 22 comprises a present address register 220 and a stride register 222 with outputs coupled to respective inputs of an adder 224. An output of the adder 224 is coupled to an input of the present address register 220 and the full signal output of the FIFO register 20 is coupled to a load enable input of the present address register.

In operation, the FIFO register 20 indicates whether it is full or whether it has room for storing additional data items. If there is room for at least one additional data item, the address in the present address register 220 is issued to memory in order to preload data stored at that address into the FIFO register 20. Also, the sum of the address in the present address register 220 and a stride value from the stride register 222 is loaded into the present address register 220 for use in future preloading. These steps (preloading and updating the content of the present address register 220) are repeated until the FIFO register 20 indicates that it is full and these steps are resumed each time when the FIFO register 20 indicates that it is not full. Of course, in general these operations may be synchronized by a clock (not shown) and they may be subject to conditions such as address bus availability etc. To issue the present address data stream prefetch unit 12 requests access to the address bus with a lower priority than the load/store unit 19.

A qload instruction is issued to the control unit 26. When a qload instruction qload S,R requests data from the FIFO register 20, data is extracted from the FIFO register 20 if this FIFO register 20 indicates that it is not empty; otherwise the control unit 26 stalls the processor until the FIFO register 20 indicates that it is not empty.

Thus, the full signal output of the FIFO register 20 manages the initiation of issue of preload addresses. Extraction of data from the FIFO register 20 indirectly causes a preload, in that extraction creates (additional) room in the FIFO register 20 and thereby enables the address stream computation unit 22 to initiate an additional preload. When the program extracts data from the FIFO register 20 at a lower rate than data can be fetched from memory, the FIFO register 20 will fill up after some initial period and after that new data will be fetched every time when data is extracted from the FIFO register 20. But when the program (temporarily) extracts data at a higher rate than data can be fetched from memory, preloading into the FIFO register 20 does not need to be in lock-step with extraction.

A respective circuit shown in FIG. 3 may be present for each of multiple address streams, but of course one may also share an address computation unit between several address streams. In this case the data prefetch unit 12 stores present address values and stride values for multiple address streams. The data prefetch unit 12 each time selects an address stream associated with a FIFO register that indicates that it is not full and uses the present address for the selected stream to preload data and to compute a new value for the present address of that stream.

More complicated mechanisms for preloading data may also be used. For example a preload for a queue may be executed directly in response to the load instruction addressing the queue. In this case each time such a load instruction for a stream is executed the data prefetch unit 12 adds the stride value for the specified address stream to the present address for that specified address stream. The present address is issued to the data cache memory 11 (in alternative designs, the present address before or after addition may be used, as long as all addresses from the address stream are used). When the data cache memory 11 returns the data stored at the present address, the data prefetch unit 12 signals the particular FIFO queue 14a,b corresponding to the specified address stream to load the returned data.

As a result of the preloading into the FIFO queues the data can later be accessed with minimal latency from the FIFO queues 14a,b. Also, the data is available in cache memory 11, so that when it is addressed by the load/store unit 19, the data can be returned relatively quickly, without consulting main memory 10. When the data stored at the present address is already present in data cache memory 11 when the data prefetch unit prefetches this data, the data cache memory 11 will not access main memory 10. Thus traffic on the memory bus between data cache memory 11 and main memory 10 is reduced. Fetching of data addressed by the present address from main memory and the administration of data cache memory is handled by the data cache memory 11 and does not affect FIFO queues 14a,b.

In a further embodiment (not shown) the FIFO queues 14a,b may be register mapped. This means that if the input register argument of instructions from a program issued by instruction issue unit 18 indicates a particular register that is "mapped onto " a particular FIFO queue 14a,b, the oldest data is extracted from that particular FIFO queue 14a,b and supplied directly to the execution unit 16 or any other unit that executes the instruction. Subsequently, the data prefetch unit then adds the stride value of that particular stream to the present address of that particular stream and prefetches data from the memory location addressed by the present address. Thus, data from the FIFO queues 14a,b may be processed without first loading it into the register file 17.

Optionally a "terminate stream " instruction from instruction issue unit 18 also specifies a stream number. Such terminate stream instructions are contained in a program executed by the data processor. In one embodiment the terminate stream instruction specifies a final address and causes the data prefetch unit 12 to stop prefetching for the specified stream once the present address reaches the final address. Alternatively, the terminate stream instruction may simply cause the data prefetch unit 12 to stop prefetching immediately. In addition a flush instruction may be available for clearing the FIFO queue 14a,b corresponding to a specified stream; optionally flush may be inherent in the terminate stream instruction.

What is claimed is:

1. A data processor comprising a memory;

a data prefetch unit, arranged for generating addresses from a plurality of address streams, each address stream having a present address and programmable information for computing updates of the present address, the data prefetch unit updating the present address in response to progress of execution of a program executed by the data processor, the data prefetch unit causing prefetch of data from addresses successively addressed by the present address in response to progress of execution of a program by the processor, characterized in that the data prefetch unit comprises a respective FIFO queue for storing prefetched data from each of the address streams respectively, the processor having an instruction set comprising an instruction for causing the data prefetch unit to extract an oldest data from the FIFO queue for an address stream and for causing the data processor to use the oldest data in the manner of operand data of the instruction.

2. A data processor according to claim 1 comprising a register file, the instruction set comprising further instructions for causing the data processor to fetch operand data from the register file, the instruction and the further instructions having a latency of a same number of clock cycles for fetching operand data from the FIFO queue and the register file respectively when the oldest data is present in the FIFO queue.

3. A data processor according to claim 1, each FIFO queue having an output for a FIFO full/not full signal, the data prefetch unit being arranged to update the present address and to prefetch data addressed by the present address in response to indication by the FIFO full/not full signal that the FIFO is not full.

4. A data processor according to claim 1, the memory comprising a main memory and a cache memory, the data prefetch unit being coupled to the cache memory and to the main memory via the cache memory, the data prefetch unit prefetching the content of main memory at the present address through the data cache memory.

5. A data processor according to claim 1, the processor having an instruction set comprising a further instruction for starting prefetching from the addresses of at least one of the address streams.

6. A data processor according to claim 5, wherein the further instruction provides for indication of one of the address streams, an initial value of the present address and a stride value, the next value being generated each time by adding the stride value indicated in the further instruction to the present address of the indicated stream.

* * * * *